US010641332B2

(12) United States Patent
Nonato de Paula et al.

(10) Patent No.: US 10,641,332 B2
(45) Date of Patent: May 5, 2020

(54) ROLLER ELEMENT BEARING WITH PRELOADED HYDRODYNAMIC CAGE GUIDES

(71) Applicant: General Electric Company, Schenectady, NY (US)

(72) Inventors: Fabio Nonato de Paula, Niskayuna, NY (US); Bugra Han Ertas, Niskayuna, NY (US); Darren Lee Hallman, Scotia, NY (US)

(73) Assignee: General Electric Company, Schenectady, NY (US)

( * ) Notice: Subject to any disclaimer, the term of this patent is extended or adjusted under 35 U.S.C. 154(b) by 599 days.

(21) Appl. No.: 15/370,484

(22) Filed: Dec. 6, 2016

(65) Prior Publication Data

US 2018/0156274 A1  Jun. 7, 2018

(51) Int. Cl.
*F01D 25/16* (2006.01)
*F16C 33/46* (2006.01)
(Continued)

(52) U.S. Cl.
CPC ........ *F16C 33/4605* (2013.01); *F01D 25/162* (2013.01); *F02C 7/06* (2013.01);
(Continued)

(58) Field of Classification Search
CPC .............. F16C 33/4605; F16C 33/3806; F16C 33/4623; F16C 33/6614; F16C 33/6651; F01D 25/162; F02C 7/06; F04D 29/056
See application file for complete search history.

(56) References Cited

U.S. PATENT DOCUMENTS 2,946,633 A * 7/1960 Gothberg ............ F16C 33/4611
  384/576
3,188,719 A * 6/1965 Howles ............... F16C 33/4629
  219/150 V
(Continued)

FOREIGN PATENT DOCUMENTS

DE   10 2012 016 983 A1    3/2014
DE      102012016983 A1 *  3/2014   .......... F16C 33/6614
(Continued)

OTHER PUBLICATIONS

International Search Report and Written Opinion issued in connection with corresponding PCT Application No. PCT/US2017/055519 dated Nov. 22, 2017.
(Continued)

*Primary Examiner* — Moshe Wilensky
*Assistant Examiner* — Theodore C Ribadeneyra
(74) *Attorney, Agent, or Firm* — Armstrong Teasdale LLP

(57) ABSTRACT

A bearing includes an inner ring having an outer surface and a cage having both an inner surface and an outer surface. The cage inner surface is positioned to be in opposition to the inner ring outer surface. The bearing further includes an outer ring having both an inner surface and an outer surface. The outer ring inner surface is positioned to be in opposition to the cage outer surface. One or more of the inner ring outer surface, the cage inner surface, the cage outer surface, and the outer ring inner surface defines a non-circular circumferential profile.

18 Claims, 11 Drawing Sheets

(51) Int. Cl.

| | | |
|---|---|---|
| *F16C 19/52* | (2006.01) | |
| *F16C 19/26* | (2006.01) | |
| *F02C 7/36* | (2006.01) | |
| *F02C 7/06* | (2006.01) | |
| *F04D 19/00* | (2006.01) | |
| *F04D 29/056* | (2006.01) | |
| *F16C 33/66* | (2006.01) | |
| *F16C 33/38* | (2006.01) | |
| *F16C 19/04* | (2006.01) | |
| *F16C 17/02* | (2006.01) | |
| *F16C 19/24* | (2006.01) | |
| *F16C 19/22* | (2006.01) | |

(52) U.S. Cl.
CPC .............. *F02C 7/36* (2013.01); *F04D 19/002* (2013.01); *F04D 29/056* (2013.01); *F16C 17/028* (2013.01); *F16C 19/04* (2013.01); *F16C 19/225* (2013.01); *F16C 19/24* (2013.01); *F16C 19/26* (2013.01); *F16C 19/52* (2013.01); *F16C 33/3806* (2013.01); *F16C 33/4623* (2013.01); *F16C 33/6614* (2013.01); *F16C 33/6651* (2013.01); *F16C 2360/23* (2013.01); *F16C 2360/24* (2013.01); *F16C 2361/61* (2013.01)

(56) References Cited

U.S. PATENT DOCUMENTS

| | | | | |
|---|---|---|---|---|
| 3,542,443 | A * | 11/1970 | Eklund | F16C 33/6696 384/463 |
| 3,649,093 | A * | 3/1972 | Muratore | F16C 33/3806 384/463 |
| 3,832,023 | A | 8/1974 | Fairbank | |
| 4,192,560 | A | 3/1980 | Hartnett | |
| 4,208,078 | A * | 6/1980 | Miki | F16C 33/4635 29/898.061 |
| 4,934,841 | A * | 6/1990 | De Vito | F16C 33/4635 384/572 |
| 5,642,945 | A * | 7/1997 | Abe | F16C 33/416 384/470 |
| 6,223,616 | B1 * | 5/2001 | Sheridan | F16H 1/2827 184/6.12 |
| 6,742,934 | B2 * | 6/2004 | Matsuyama | F16C 33/3856 384/572 |
| 7,594,761 | B2 | 9/2009 | Koyama et al. | |
| 8,801,295 | B2 | 8/2014 | Ueno | |
| 8,894,294 | B2 * | 11/2014 | Durney | F16C 33/6629 384/578 |
| 8,974,123 | B2 | 3/2015 | Schulz | |
| 9,109,629 | B2 * | 8/2015 | Moratz | F16C 33/6614 |
| 9,267,543 | B2 * | 2/2016 | Suzuki | F16C 19/364 |
| 9,316,263 | B2 | 4/2016 | Kullin | |
| 9,677,659 | B1 * | 6/2017 | Niergarth | F02C 7/36 |
| 10,113,633 | B2 * | 10/2018 | Niergarth | F02C 7/36 |
| 10,234,018 | B2 * | 3/2019 | Hasting | F16H 57/0471 |
| 2003/0181246 | A1 * | 9/2003 | Amborn | F16D 3/065 464/167 |
| 2007/0202986 | A1 * | 8/2007 | Kotani | F16C 33/543 475/331 |
| 2009/0154861 | A1 * | 6/2009 | Becker | F04B 1/2085 384/569 |
| 2009/0214147 | A1 | 8/2009 | Doung | |
| 2010/0261571 | A1 * | 10/2010 | Matsuoka | F16H 1/2827 475/331 |
| 2011/0105270 | A1 * | 5/2011 | Matsuoka | F02C 7/36 475/331 |
| 2012/0063713 | A1 | 3/2012 | Beuerlein | |
| 2013/0035190 | A1 * | 2/2013 | McCune | F02C 7/32 475/159 |
| 2013/0095974 | A1 * | 4/2013 | Imai | F16H 57/0479 475/159 |
| 2013/0102432 | A1 * | 4/2013 | Imai | F16H 57/0409 475/159 |
| 2013/0310213 | A1 * | 11/2013 | Matsuoka | F16H 1/2818 475/347 |
| 2015/0377343 | A1 * | 12/2015 | Fugel | F16C 19/30 475/159 |
| 2016/0017752 | A1 * | 1/2016 | Coffin | B64D 29/06 475/331 |
| 2016/0208850 | A1 * | 7/2016 | Durling | F16C 39/04 |
| 2017/0089218 | A1 * | 3/2017 | Hasting | F16C 33/34 |

FOREIGN PATENT DOCUMENTS

| | | |
|---|---|---|
| EP | 2884128 A1 | 6/2015 |
| EP | 3 093 512 A1 | 11/2016 |
| JP | H02-72219 A | 3/1990 |
| JP | H07-27134 A | 1/1995 |
| JP | H11-22737 A | 1/1999 |
| JP | 2010025191 A | 2/2010 |
| JP | 2011-122605 A | 6/2011 |
| JP | 2014-095442 A | 5/2014 |

OTHER PUBLICATIONS

Pradeep K. Gupta, "Cage unbalance and wear in roller bearings", Wear, vol. 147, Issue: 1, pp. 105-118, Jul. 5, 1991.

Yang et al., "Dynamic simulation of cage in high speed cylindrical roller bearing based on flexible vody method", Computer Design and Applications (ICCDA), 2010 International Conference on, vol. 3, pp. V3-590-V3-594, Jun. 25-27, 2010, Qinhuangdao.

* cited by examiner

ROLLER ELEMENT BEARING WITH PRELOADED HYDRODYNAMIC CAGE GUIDES

BACKGROUND

The present disclosure relates generally to an epicyclic gearbox assembly and, more specifically, to a preloaded hydrodynamic journal bearing guide for a roller bearing cage that increases the stability of the roller bearing cage while in operation.

At least some known gas turbine engines, such as turbofan engines, include a fan, a core engine, and a power turbine. The core engine includes at least one compressor, a combustor, and a high-pressure turbine coupled together in a serial flow relationship. More specifically, the compressor and high-pressure turbine are coupled through a first drive shaft to form a high-pressure rotor assembly. Air entering the core engine is mixed with fuel and ignited to form a high energy gas stream. The high energy gas stream flows through the high-pressure turbine to rotatably drive the high-pressure turbine such that the shaft rotatably drives the compressor. The gas stream expands as it flows through a power or low-pressure turbine positioned aft of the high-pressure turbine. The low-pressure turbine includes a rotor assembly having a fan coupled to a second drive shaft. The low-pressure turbine rotatably drives the fan through the second drive shaft.

The drive shafts in the turbine engine are typically supported by one or more bearings, and at least some known turbofans include a speed-reducing gearbox coupled along the drive shaft between the low-pressure turbine and the fan. The gearbox facilitates decoupling the fan tip speed from the speed of the low-pressure turbine. For example, at least some known gearboxes include a sun gear engaged with and rotatably mounted radially inward relative to a plurality of planetary gears. The planetary gears each include a roller bearing cage having a plurality of roller elements therein. In operation, the planetary gears sometimes rotate circumferentially about the sun gear, and also rotate about an axis. As the rotational speed of the planetary gears increases, rotation of the planetary gears about the sun gear induces a centrifugal field on the roller bearing cages of the planetary gears. This can result in excess loading and destabilization of the roller bearing cages from their original centered position and a reduction in the service life of the bearings. Also, dynamic unbalanced loads can arise in operation due to material and manufacturing inhomogeneities of the cage. At some operating speeds, the roller bearing cages of the planetary gears can enter an unstable operation condition due to the dynamic unbalanced loads that leads to chaotic orbiting around the bearing axis. This can result in reducing the service life of the planetary gears.

BRIEF DESCRIPTION

In one aspect, a bearing is provided. The bearing includes an inner ring having an outer surface and a cage having both an inner surface and an outer surface. The cage inner surface is positioned to be in opposition to the inner ring outer surface. The bearing further includes an outer ring having both an inner surface and an outer surface. The outer ring inner surface is positioned to be in opposition to the cage outer surface. One or more of the inner ring outer surface, the cage inner surface, the cage outer surface, and the outer ring inner surface defines a non-circular circumferential profile.

In another aspect, a gearbox is provided. The gearbox includes a central gear and a plurality of planetary gears positioned circumferentially about the central gear. Each planetary gear of the plurality of planetary gears includes a bearing. The bearing includes an inner ring having an outer surface and a cage having both an inner surface and an outer surface. The cage inner surface is positioned to be in opposition to the inner ring outer surface. The bearing further includes an outer ring having both an inner surface and an outer surface. The outer ring inner surface is positioned to be in opposition to the cage outer surface. One or more of the inner ring outer surface, the cage inner surface, the cage outer surface, and the outer ring inner surface defines a non-circular circumferential profile.

In yet another aspect, a rotary machine is provided. The rotary machine includes a fan section, a turbine section, and a gearbox coupled between the fan section and the turbine section. The gearbox includes a plurality of planetary gears positioned circumferentially about a central gear, each planetary gear of the plurality of planetary gears including a bearing. The bearing includes an inner ring having an outer surface, and a cage having both an inner surface and an outer surface. The cage inner surface is positioned to be in opposition to the inner ring outer surface. The bearing further includes an outer ring having both an inner surface and an outer surface. The outer ring inner surface is positioned to be in opposition to the cage outer surface. One or more of the inner ring outer surface, the cage inner surface, the cage outer surface, and the outer ring inner surface defines a non-circular circumferential profile.

DRAWINGS

These and other features, aspects, and advantages of the present disclosure will become better understood when the following detailed description is read with reference to the accompanying drawings in which like characters represent like parts throughout the drawings, wherein.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged. Such ranges are identified and include all the sub-ranges contained therein unless context or language indicates otherwise.

As used herein, the terms "axial" and "axially" refer to directions and orientations that extend substantially parallel to a centerline of the turbine engine or the roller bearing cage. Moreover, the terms "radial" and "radially" refer to directions and orientations that extend substantially perpendicular to the centerline of the turbine engine or the roller bearing cage. In addition, as used herein, the terms "circumferential" and "circumferentially" refer to directions and orientations that extend arcuately about the centerline of the turbine engine or the roller bearing cage.

Embodiments of the present disclosure relate to a bearing assembly having non-circular circumferential profiles (henceforth known as lobes) for providing reaction forces to center a roller bearing cage within the bearing assembly. More specifically, the reaction forces arise from a fluid within the bearing assembly and between the lobes and shoulders of an inner ring or outer ring, or between lobes and the roller bearing cage. The lobes provide for more stable operation of the bearing assembly by inducing reaction forces that center the roller bearing cage in the bearing assembly and compensate for dynamic unbalanced loads and external loading due to an induced centrifugal field on roller bearing cage.

Figure 1:
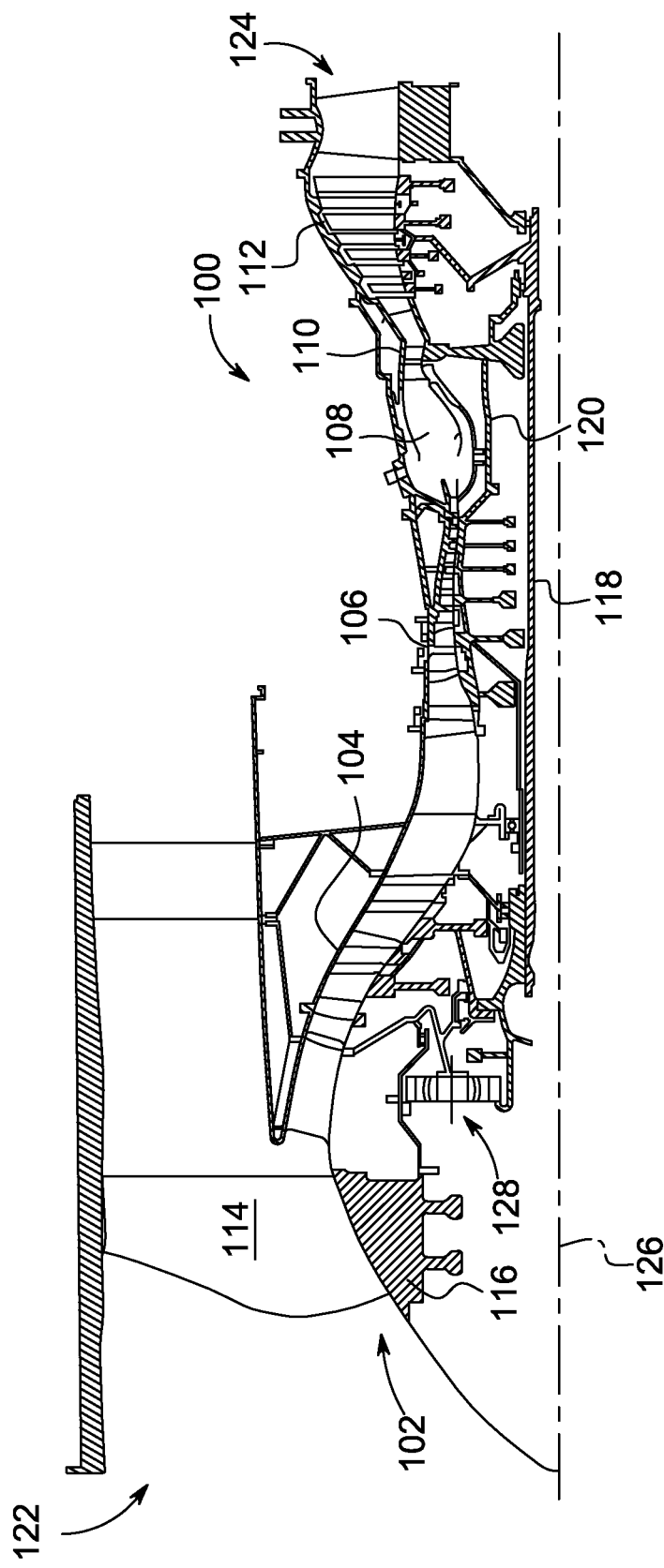
FIG. 1 is a schematic illustration of an exemplary turbine engine assembly.

FIG. 1 is a schematic illustration of an exemplary rotary machine 100, i.e., a turbomachine, and more specifically, a turbine engine. In the exemplary embodiment, turbine engine 100 is a gas turbofan aircraft engine. Alternatively, turbine engine 100 is any other turbine engine and/or rotary machine, including, without limitation, a gas turbine engine, a steam turbine engine, other aircraft engine, a wind turbine, a compressor, and a pump. Turbine engine assembly 100 includes a fan assembly 102, a low pressure or booster compressor 104, a high-pressure compressor 106, and a combustor 108. Fan assembly 102, booster compressor 104, high-pressure compressor 106, and combustor 108 are coupled in flow communication. Turbine engine assembly 100 also includes a high-pressure turbine 110 coupled in flow communication with combustor 108 and a low-pressure turbine section 112. Fan assembly 102 includes an array of fan blades 114 extending radially outward from a rotor disk 116. Low-pressure turbine 112 is coupled to fan assembly 102 and booster compressor 104 via a first drive shaft 118, and high-pressure turbine 110 is coupled to high-pressure compressor 106 via a second drive shaft 120. Turbine engine assembly 100 has an intake 122 and an exhaust 124. Turbine engine assembly 100 further includes a centerline 126 about which fan assembly 102, booster compressor 104, high-pressure compressor 106, and turbine assemblies 110 and 112 rotate. Moreover, a speed-reducing gearbox 128 is coupled along first drive shaft 118 between fan assembly 102 and low-pressure turbine section 112.

In operation, air entering turbine engine assembly 100 through intake 122 is channeled through fan assembly 102 towards booster compressor 104. Compressed air is discharged from booster compressor 104 towards high-pressure compressor 106. Highly compressed air is channeled from high-pressure compressor 106 towards combustor 108, mixed with fuel, and the mixture is combusted within combustor 108. High temperature combustion gas generated by combustor 108 is channeled towards turbine assemblies 110 and 112. Low-pressure turbine 112 rotates at a first rotational speed, and gearbox 128 operates such that fan assembly 102 operates at a second rotational speed lower than the first rotational speed. Combustion gas is subsequently discharged from turbine engine assembly 100 via exhaust 124.

Figure 2:
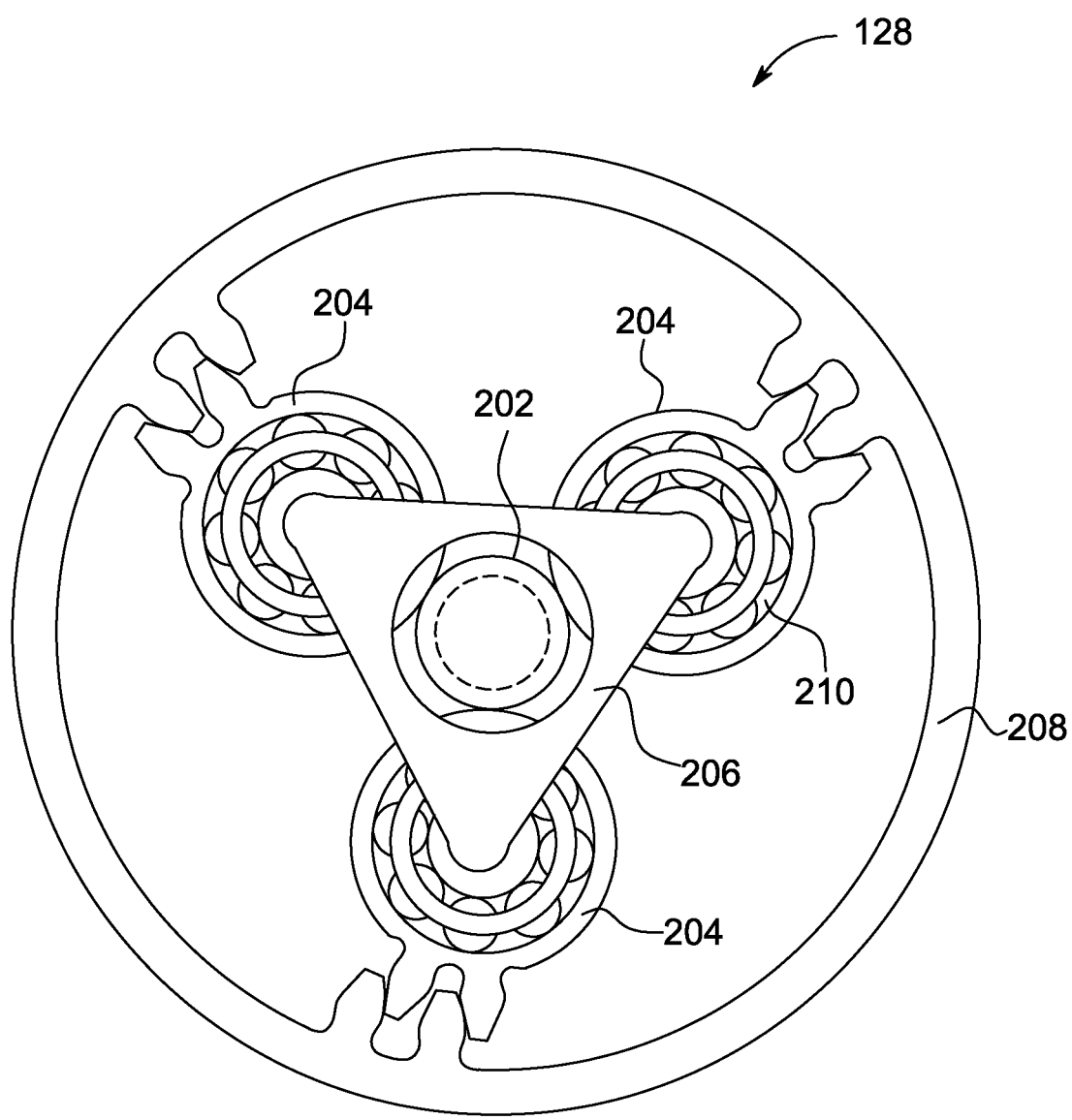
FIG. 2 is a schematic end view of an exemplary gearbox that may be used in the turbine engine assembly shown in FIG. 1.

FIG. 2 is a schematic end view of gearbox 128 that may be used in turbine engine assembly 100 (shown in FIG. 1). In the exemplary embodiment, gearbox 128 includes a least one sun or central gear 202, and a plurality of planetary gears 204 that are each rotatably coupled to central gear 202. Gearbox 128 further includes a carrier member 206 coupled to and extending about the plurality of planetary gears 204. The plurality of planetary gears 204 are positioned circumferentially about central gear 202 and are meshed with central gear 202 (gear teeth partially or completely omitted). Planetary gears 204 are positioned in and meshed with an annular gear 208 (gear teeth partially or completely omitted). In the exemplary embodiment, annular gear 208 is fixed, and central gear 202 is driven and in turn drives planetary gears 204. Planetary gears 204 rotate about central gear 202, and carrier member 206 rotates about a centerline axis passing through the center of central gear 202. In an alternative embodiment, carrier element 206 is fixed, and planetary gears 204 do not rotate about the centerline axis passing through the center of central gear 202. Central gear 202 is driven and drives planetary gears 204. Planetary gears 204 drive annular gear 208. In all embodiments, as described above, central gear 202 and planetary gears 204 cooperate to produce differential speeds for different portions of turbine engine assembly 100.

In the exemplary embodiment, each planetary gear 204 includes a bearing assembly 210. Bearing assembly 210 operates to facilitate rotating of planetary gears 204 in carrier member 206 and to facilitate rotating of planetary gears 204 about central gear 202 upon actuation of carrier member 206. In alternative embodiments, as described above, carrier member 206 is fixed, and bearing assembly 210 operates to facilitate rotating of planetary gears in carrier member 206, but planetary gears 204 do not rotate about central gear 202.

Figure 3:
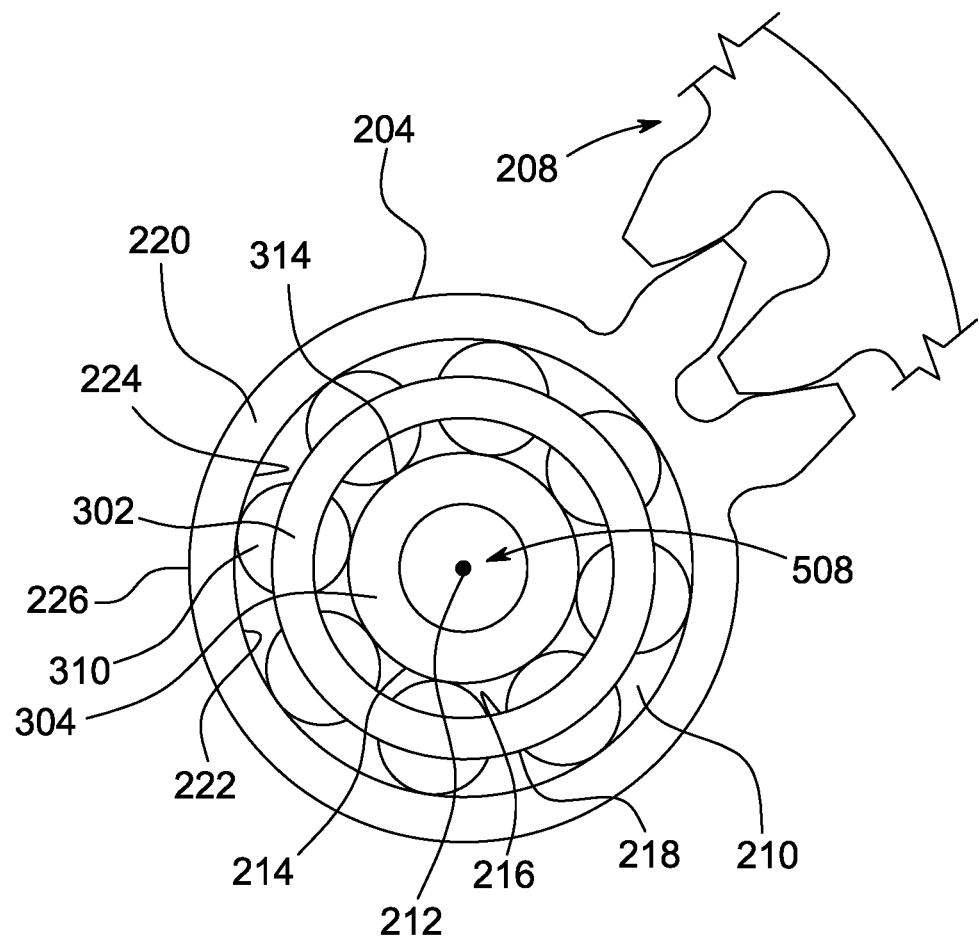
FIG. 3 is a schematic end view of an exemplary planetary gear that may be used in the gearbox shown in FIG. 2.

FIG. 3 is a schematic end view of a planetary gear 204 including a bearing assembly 210. Planetary gear 204 is positioned in, and meshed with, annular gear 208 (annular gear 208 is partially omitted). In the exemplary embodiment, planetary gear 204 includes bearing assembly 210. Bearing assembly 210 includes a center 212 coupled to carrier element 206 (shown in FIG. 2). Bearing assembly 210 further includes a longitudinal centerline 508 that extends axially through center 212. Bearing assembly 210 further includes an inner ring 304 having an inner ring outer surface 214. Bearing assembly 210 further includes a roller bearing cage 302 having a cage inner surface 216 and cage outer surface 218. Bearing assembly 210 further includes an outer ring 220 having an outer-ring inner surface 222 and an outer-ring outer surface 226. Inner-ring outer surface 214 and outer-ring inner surface 222 have an inner-ring shoulder 314, and an outer-ring shoulder 224 respectively. Cage inner surface 216 is in opposition to inner ring outer surface 214, while cage outer surface 218 is in opposition to outer ring inner surface 222. Rollers 310 reside within roller bearing cage 302. In operation, one or more of the inner-ring outer surface 214, inner-ring shoulder 314, cage-inner surface 216, cage-outer surface 218, outer-ring inner surface 222, or outer-ring shoulder 224 has lobes 402 (shown in FIG. 5).

Figure 4:
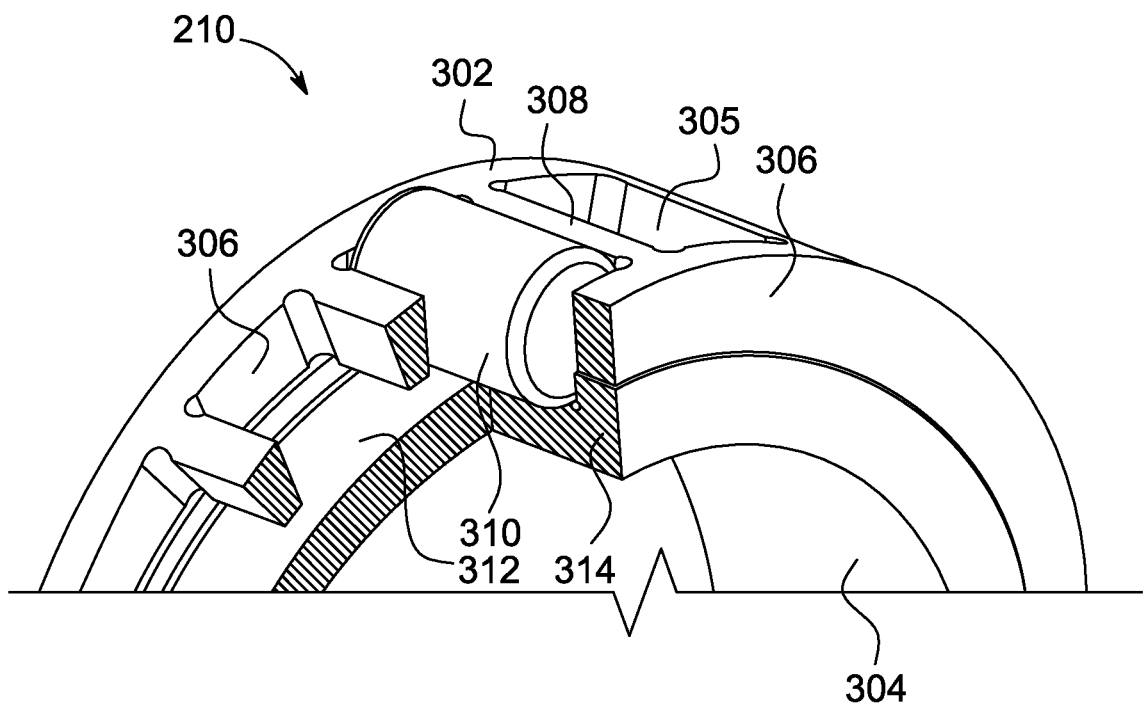
FIG. 4 is a schematic perspective partial cross-sectional view of an exemplary roller bearing cage and inner ring that may be used in the gearbox shown in FIG. 2.

FIG. 4 is a schematic perspective partial cross-sectional view of bearing assembly 210 including a roller bearing cage 302 and an inner ring 304 that may be used in gearbox 128 (shown in FIG. 2). Roller bearing cage 302 includes a plurality of openings 305. Roller bearing cage 302 includes a pair of circumferential side rails 306 and a plurality of web members 308 extending between circumferential side rails 306. Circumferential side rails 306 and web members 308 define openings 305. Openings 305 each contain a roller 310 (additional rollers 310 omitted for clarity). Rollers 310 are free to rotate within openings 305. Roller bearing cage 302 positions rollers 310 relative to inner ring 304. Roller bearing cage 302 guides and separates rollers 310 from each other during operation to provide for rotation of outer ring 220 (shown in FIG. 2), disposed at least partially around roller bearing cage 302, relative to inner ring 304.

Inner ring 304 has a diameter less than that of roller bearing cage 302 and is disposed within roller bearing cage 302. Roller bearing cage 302 positions rollers 310 at least partially within inner ring 304. Rollers 310 contact an inner race 312 and travel within a pair of inner-ring shoulders 314. Inner-ring shoulders 314 guide and at least partially support roller bearing cage 302 as roller bearing cage 302 rotates relative to inner ring 304. Circumferential side rails 306 of roller bearing cage 302 form a hydrodynamic bearing with one or more of inner-ring shoulders 314 and outer-ring shoulders 224 (shown in FIG. 3). This significantly increases the support to roller bearing cage 302 given by one or more of inner-ring shoulders 314 or outer-ring shoulders 224.

The outer ring 220 (shown in FIG. 3) of bearing assembly 210 has a diameter larger than the diameter of inner ring 304. The diameter of the outer ring is also larger than the diameter of roller bearing cage 302. Rollers 310 extend within the outer ring 220 and provide for rotation of the outer ring relative to inner ring 304. Roller bearing cage 302 and outer-ring shoulders 224 (shown in FIG. 3) of outer ring 220 may form a hydrodynamic bearing. Outer-ring shoulders 224 facilitate guiding and at least partially supporting roller bearing cage 302. Bearing assembly 210 includes two sets of shoulders, an inner-ring shoulder 314, and an outer-ring shoulder 224. However, roller bearing cage 302 is guided radially by one surface at a time. In an alternative embodiment, there are no inner-ring shoulders 314, and roller bearing cage 302 is supported solely by outer-ring shoulder 224.

During operation of bearing assembly 210, dynamic unbalanced loads may arise as a result of one or more of material and manufacturing inhomogeneities present in roller bearing cage 302. Other external loads to roller bearing cage 302 come from intermittent contact between rollers 310. Dynamic unbalanced loads and external loads may induce an unstable condition of roller bearing cage 302 or bearing assembly 210 resulting in chaotic orbit around the axis of bearing assembly 210. In some embodiments as described above, bearing assembly 210, as included in planetary gear 204, rotates with carrier member 206 about central gear 202 (all shown in FIG. 2). Rotation of bearing assembly 210 about central gear 202 introduces external loading on roller bearing cage 302 that destabilizes roller bearing cage 302 from a centered position in bearing assembly 210. Reducing the clearance between roller bearing cage 302 and one or more of inner-ring shoulders 314 and outer-ring shoulders 224 (shown in FIG. 3) compensates for destabilization of roller bearing cage 302 from the centered position in bearing assembly 210. Additionally, reducing clearances between openings 305 and rollers 310 may compensate for instability in operation of bearing assembly 210. However, reducing clearances increases friction that may reduce the efficiency and service life of bearing assembly 210 and gearbox 128 (shown in FIG. 2).

Figure 5:
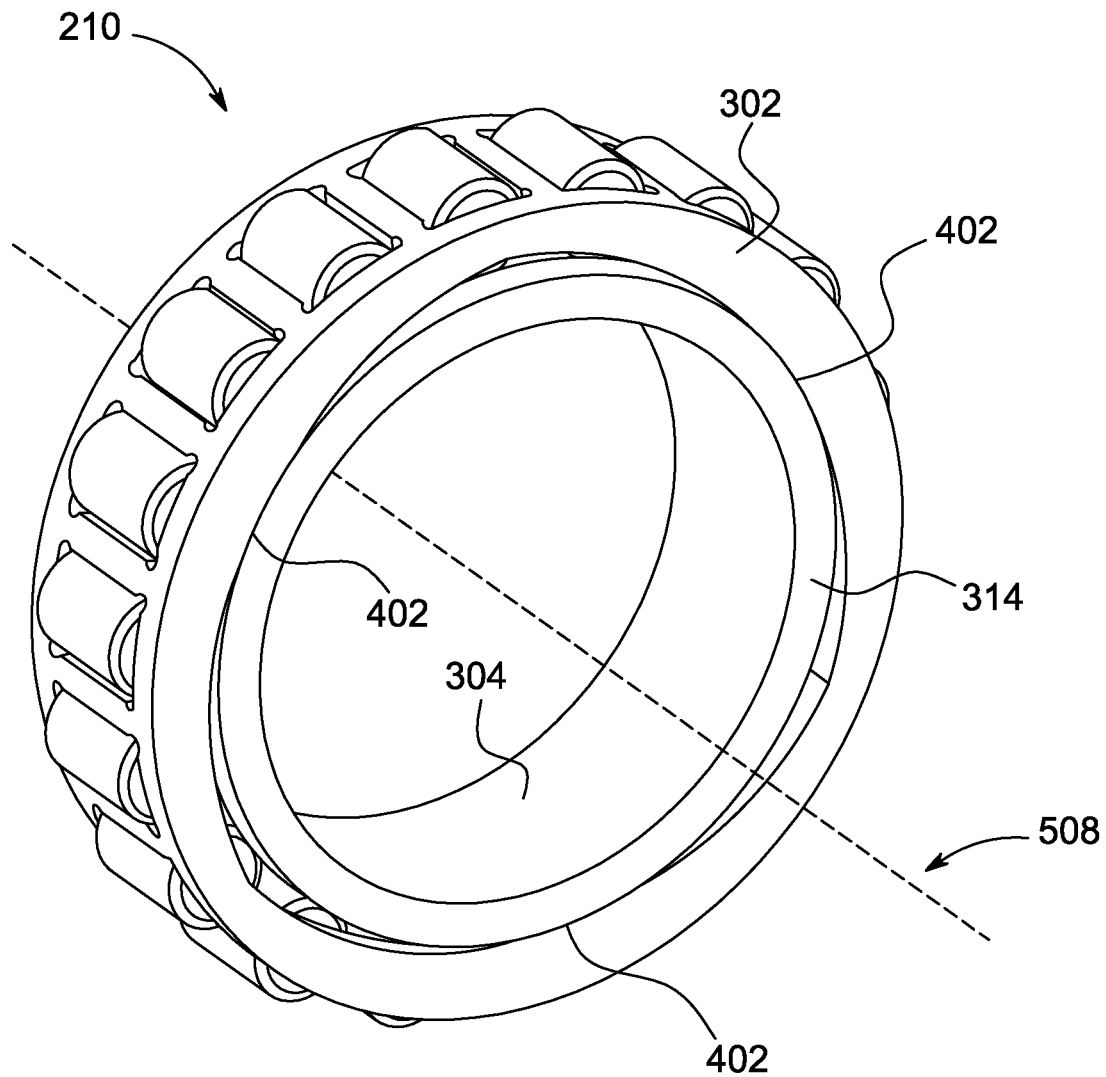
FIG. 5 is a schematic perspective view of the exemplary roller bearing cage and inner ring shown in FIG. 4.

FIG. 5 is a schematic perspective view of roller bearing cage 302 and inner ring 304 of bearing assembly 210 (shown in FIG. 3). In the exemplary embodiment, roller bearing cage 302 includes a plurality of lobes 402. Bearing assembly 210 includes a longitudinal centerline 508 that extends axially through center 212 (shown in FIG. 3) of bearing assembly 210. Lobes 402 provide reaction forces that center roller bearing cage 302 within bearing assembly 210. The reaction forces arise from the fluid within bearing assembly 210 and between lobes 402 and inner-ring shoulders 314 of inner ring 304. For example, the fluid is an oil that forms a hydrodynamic oil film between roller bearing cage 302, including lobes 402, and inner-ring shoulders 314. As the fluid is compressed at the points where lobes 402 extend towards inner-ring shoulders 314, a reaction force at roller bearing cage 302 is induced by the hydrodynamic effect of the rotating components. Lobes 402 provide for more stable operation of bearing assembly 210 by inducing reaction forces that center roller bearing cage 302 in bearing assembly 210. Lobes 402 provide for more stable operation of bearing assembly 210 without excessively reduced circumferential clearances between roller bearing cage 302 and inner-ring shoulders 314 that result in increased friction forces within bearing assembly 210. This provides for more stable operation of bearing assembly 210 and increased service life of bearing assembly 210.

Figure 6:
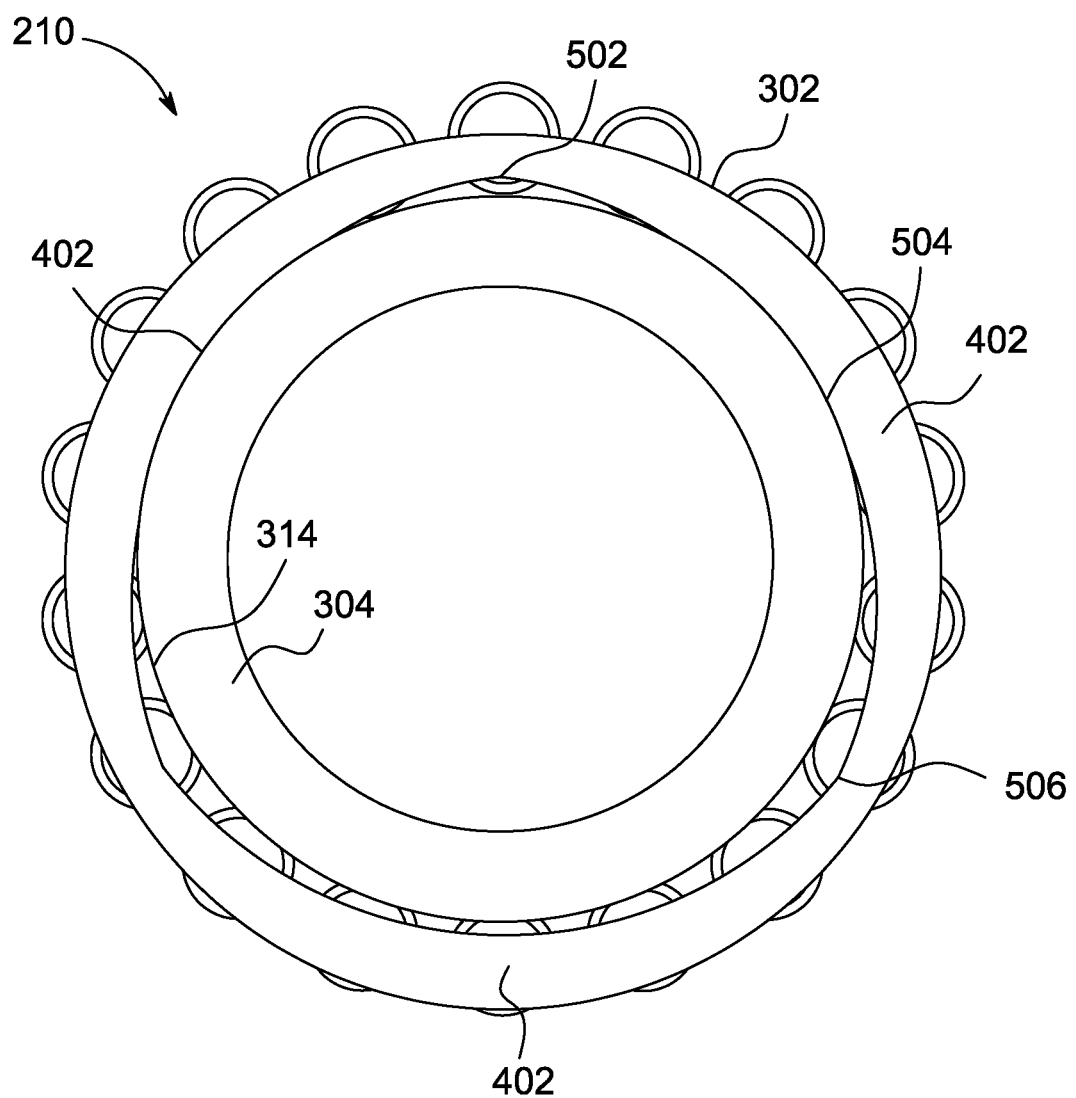
FIG. 6 is a schematic end view of the exemplary roller bearing cage and inner ring shown in FIG. 4.

FIG. 6 is a schematic end view of roller bearing cage 302 having lobes 402 and inner ring 304. Each lobe 402 includes a first endpoint 502, a midpoint 504, and a second endpoint 506. At first end point 502 and second endpoint 506, lobe 402 is at its farthest distance from inner-ring shoulders 314. At midpoint 504, lobe 402 is at its closest distance to inner-ring shoulders 314. The distance between inner-ring shoulders 314 and lobe 402 decreases from first endpoint 502 to midpoint 504. The distance between inner-ring shoulders 314 and lobe 402 increases from midpoint 504 to second endpoint 506.

Roller bearing cage 302 is depicted under a dynamic unbalanced load, for example, and without limitation, resulting from material or manufacturing inhomogeneities of roller bearing cage 302 or a centrifugal field exerted on roller bearing cage due to rotation of roller bearing cage 302 and carrier member 206 (shown in FIG. 2) about central gear 202 (shown in FIG. 2). Two lobes 402 of the plurality of lobes 402 provide reaction forces that act to center roller bearing cage 302 and provide for more stable operation resulting in a higher stability threshold of bearing assembly 210 (shown in FIG. 2).

In the exemplary embodiment, lobes 402 are disposed on roller bearing cage 302 and extend radially toward inner ring 304. Roller bearing cage 302 includes three lobes 402. In alternative embodiments, bearing assembly 210 includes a greater or lesser number of lobes 402. In alternative embodiments described later herein, lobes 402 are disposed elsewhere in bearing assembly 210. For example, and without limitation, lobes 402 are disposed on one or more of roller bearing cage 302 extending radially outward toward outer ring 904 (shown in FIG. 10), inner-ring shoulders 314 extending radially toward roller bearing cage 302, and outer ring 904, extending radially toward roller bearing cage 302.

Figure 7:
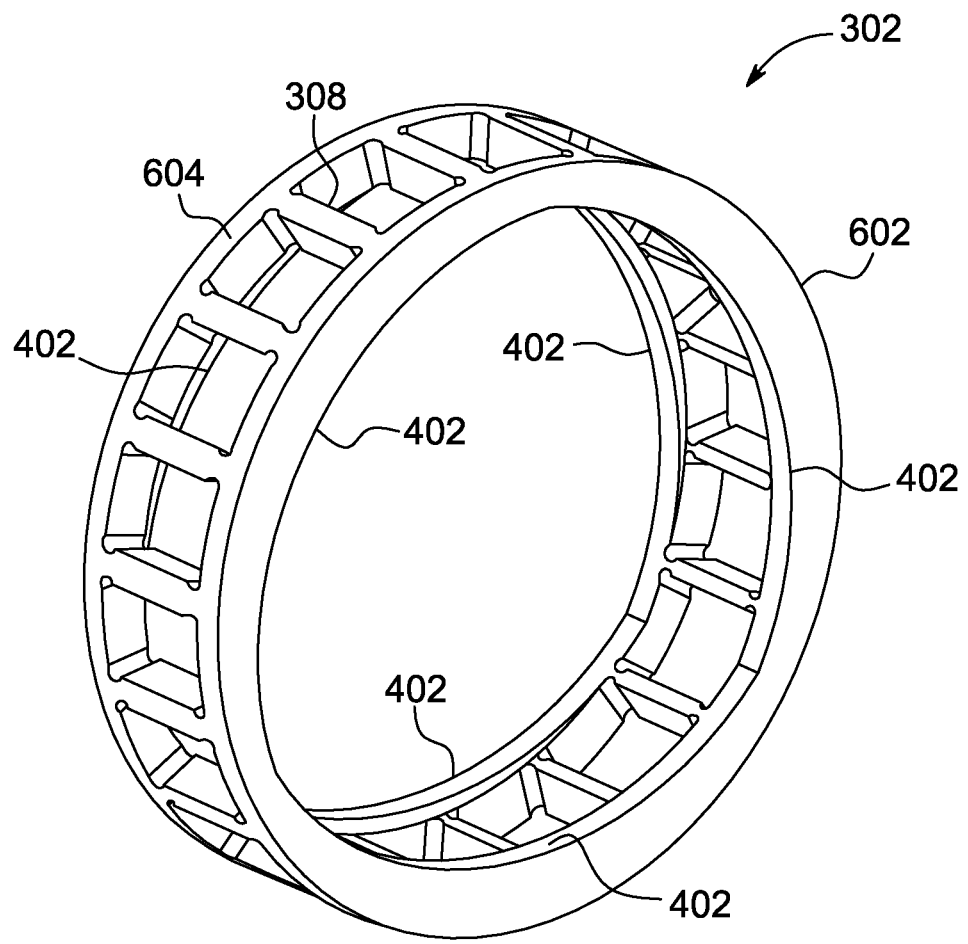
FIG. 7 is a schematic perspective view of the exemplary roller bearing cage shown in FIG. 4.

FIG. 7 is a schematic perspective view of roller bearing cage 302. Roller bearing cage 302 includes a first wall 602 and a second wall 604. Second wall 604 is positioned a distance from first wall 602. A plurality of web members 308 are coupled to first wall 602 and second wall 604 and extend between first wall 602 and second wall 604. The plurality of lobes 402 are disposed on first wall 602 and second wall 604. In the exemplary embodiment, first wall 602 includes three lobes 402 and second wall 604 includes three corresponding lobes 402. Lobes 402 on first wall 602 and second wall 604 are positioned at the same positions circumferentially on first wall 602 and second wall 604. In alternative embodiments, lobes 402 are positioned at different locations on first wall 602 and second wall 604. In some alternative embodiments, roller bearing cage 302 includes a fewer or greater number of lobes 402.

In the exemplary embodiment, roller bearing cage 302 is metallic. For example, and without limitation, one or more of roller bearing cage 302 and lobes 402 are formed as a result of a casting, machining, forging, additive manufacturing, or other metalworking processes. In alternative embodiments, one or more of roller bearing cage 302 and lobes 402 are formed from other materials. For example, and without limitation, one or more of roller bearing cage 302 and lobes 402 are formed from one or more polymer using one or more techniques such as, without limitation, molding, additive manufacturing, and machining.

Figure 8:
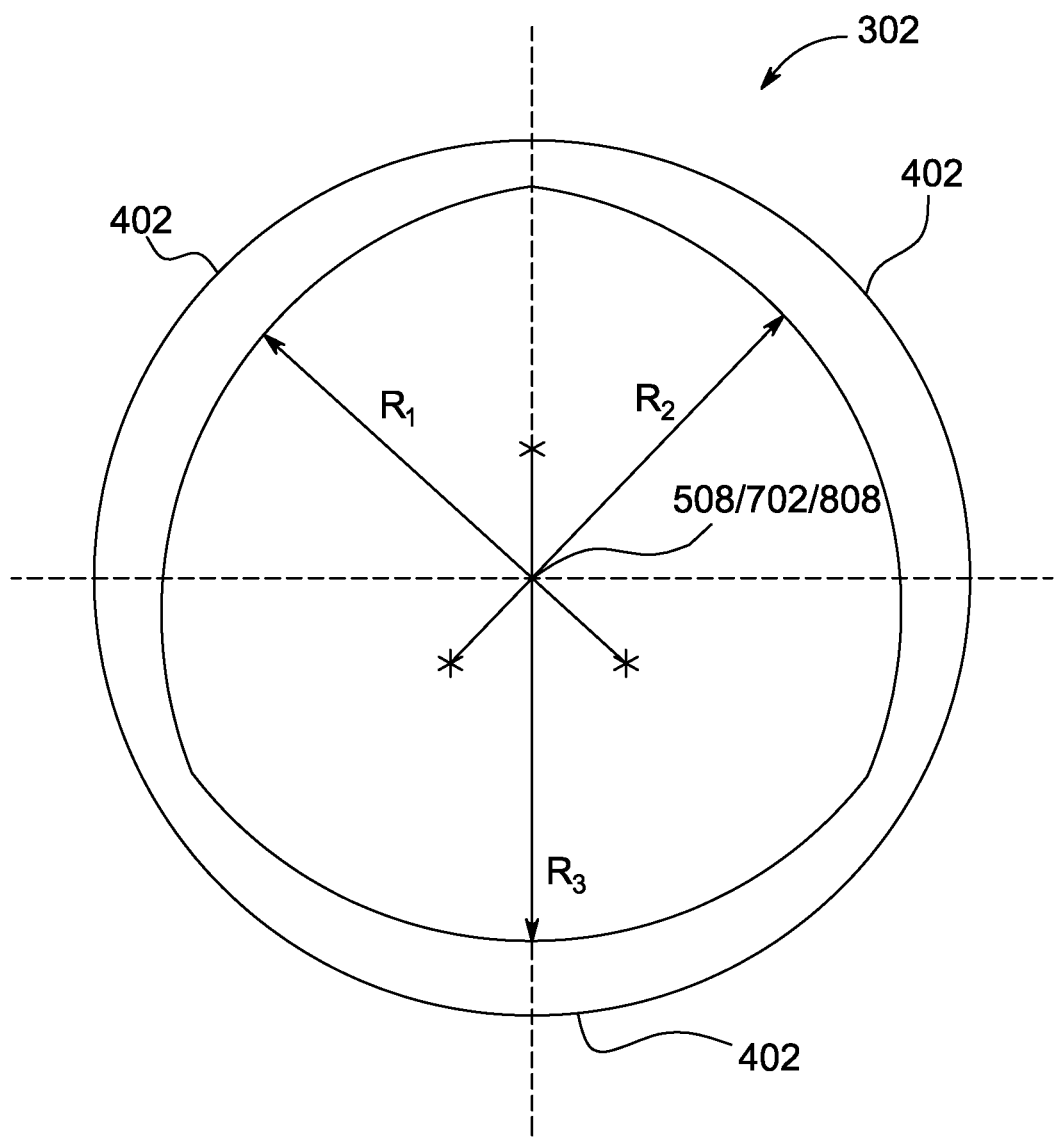
FIG. 8 is a schematic end view of the exemplary roller bearing cage shown in FIG. 4.

FIG. 8 is a schematic end view of roller bearing cage 302. Each lobe 402 of the plurality of lobes 402 defines an arc having a radius R1, R2, R3 offset radially from a center 702 of bearing assembly 210 (shown in FIG. 3). Longitudinal centerline 508 of bearing assembly 210 extends axially through center 702, both of which are positioned to always define the center of bearing assembly 210. Each lobe 402 of the plurality of lobes 402 has a fixed angularity, radially, relative to center/longitudinal centerline 702/508. At least one lobe 402 of the plurality of lobes 402 defines an arc having a substantially constant arcual angularity relative to center/longitudinal centerline 702/508.

In the exemplary embodiment, all three lobes 402 have substantially similar arcual angularity relative to center/longitudinal centerline 702/508, and, as such, all three radii R1, R2, R3 have substantially similar values. Also, in the exemplary embodiment, a plurality of longitudinal lines 808 is defined within the circumference of bearing assembly 210, where each line of lines 808 is referenced to the arcual angularity of each lobe 402 relative to center/longitudinal centerline 702/508. Such plurality of longitudinal lines 808 is further defined by the intersection of the lines representing the three radii R1, R2, R3, and as such, in FIG. 8, plurality of longitudinal lines 808 is coincident with longitudinal centerline/center 508/702.

In alternative embodiments, lobes 402 have other geometries, including having two or more of radii R1, R2, R3 having different values intersecting at a point other than longitudinal centerline/center 508/702, i.e., at a shifted plurality of longitudinal lines 808. In such alternative embodiments, the plurality of lobes 402 defines arcs having radii R1, R2, R3 offset radially from plurality of longitudinal lines 808 and having a substantially constant arcual angularity with respect to one or more of a plurality of longitudinal lines 808 (although shown in FIG. 8 as a point, the plurality of longitudinal lines 808 are a plurality of lines extending axially through bearing assembly 210). Each line 808 of the plurality of longitudinal lines 808 may be located at any position within the circumference of lobes 402. The orientation of longitudinal lines 808 may be substantially parallel to or coincident with longitudinal centerline/center 508/702. In some alternative embodiments, there are a fewer or greater number of longitudinal lines 808.

Figure 9:
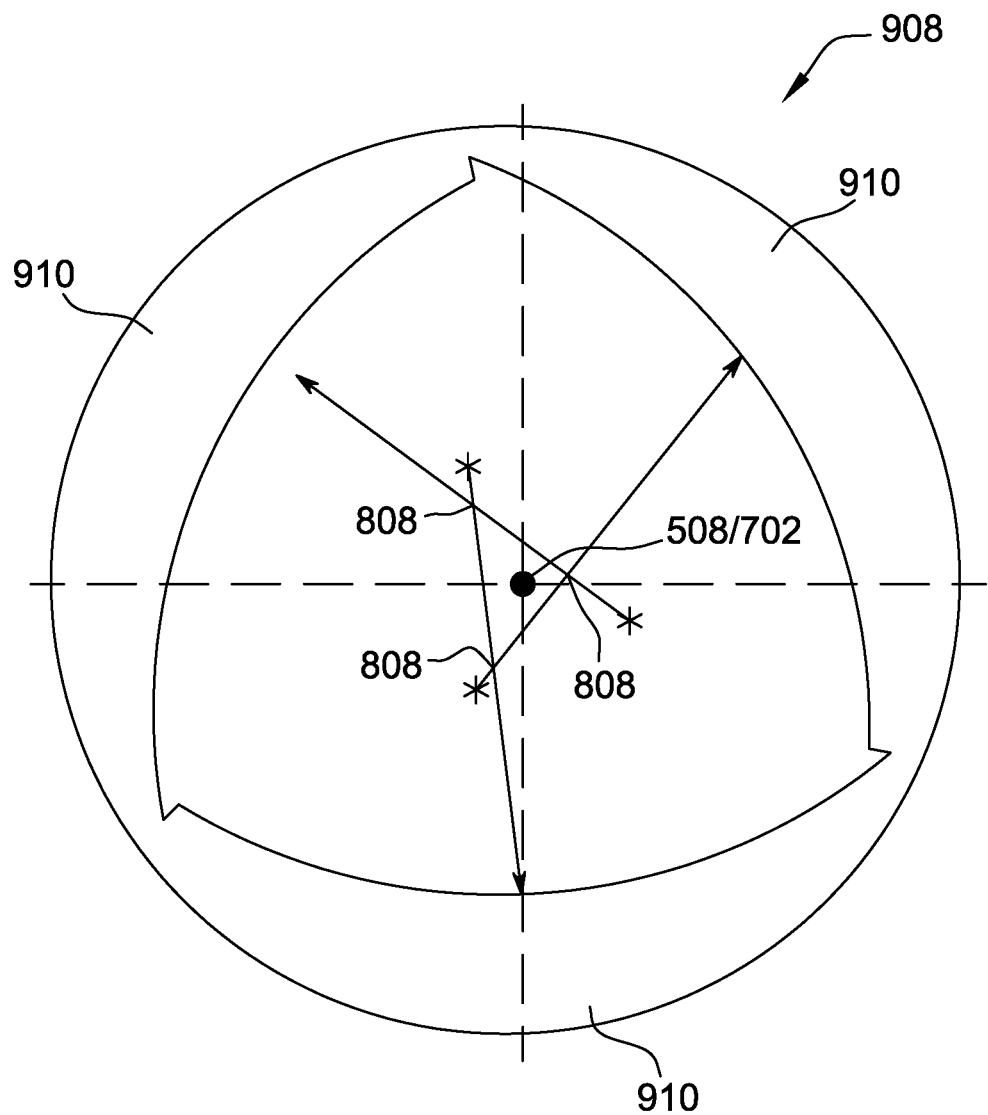
FIG. 9 is a schematic end view of an alternative roller bearing cage and a plurality of lobes that may be used in gearbox shown in FIG. 2.

FIG. 9 is a schematic end view of an alternative roller bearing cage 908 and a plurality of lobes 910 that may be used in gearbox 128 (shown in FIG. 2). In this alternative embodiment, each lobe 910 defines an arc having a radius R1, R2, R3 offset radially from one of a plurality of longitudinal lines 808 of bearing assembly 210 (shown in FIG. 3). Each lobe 910 has a substantially constant arcual angularity with respect to one of a plurality of longitudinal lines 808 (although shown in FIG. 9 as a point, the plurality of longitudinal lines 808 are a plurality of lines extending axially through bearing assembly 210). Longitudinal centerline 508 of bearing assembly 210 extends axially through center 702, both of which are positioned to always define the center of bearing assembly 210. In this alternative embodiment, a plurality of longitudinal lines 808 is defined within the circumference of bearing assembly 210, where each line of lines 808 is referenced to the arcual angularity of a lobe 910. Such plurality of longitudinal lines 808 is further defined by the intersection of at least two lines representing the three radii R1, R2, R3. For the configuration shown in FIG. 9, three lines 808 are shown in contrast to the solitary line 808 shown in FIG. 8. In this alternative embodiment, the orientation of longitudinal lines 808 is substantially parallel to longitudinal centerline/center 508/702 and radii R1, R2, R3 do not cross longitudinal centerline/center 508/702. In some alternative embodiments, roller bearing cage 902 and the plurality of lobes 910 are substantially similar to roller bearing cage 302 and the plurality of lobes 402.

Figure 10:
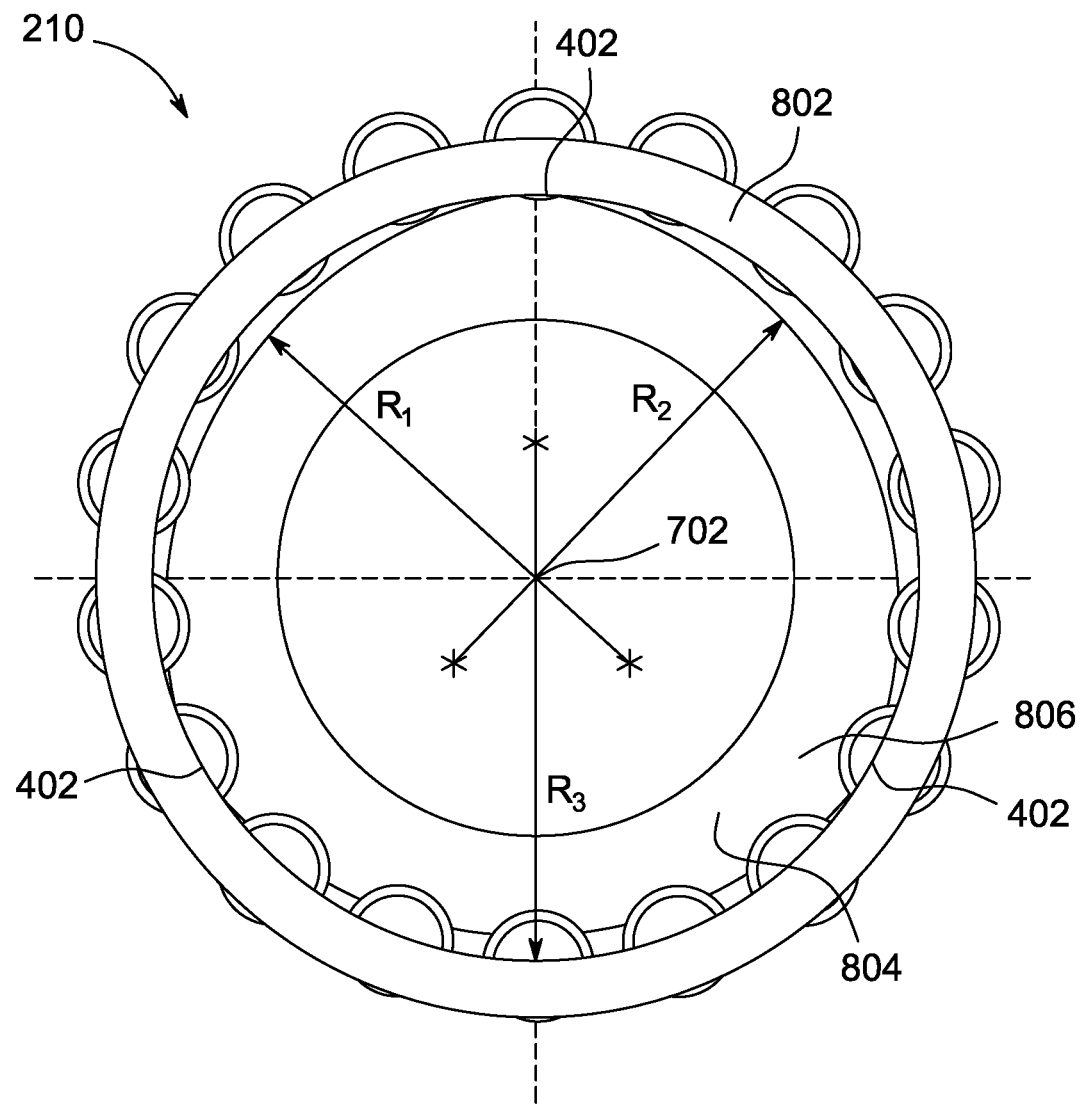
FIG. 10 is a schematic end view of an exemplary alternative roller bearing cage and inner ring that may be used in the gearbox shown in FIG. 2.

FIG. 10 is a schematic end view of an alternative roller bearing cage 802 and inner ring 804 that may be used in gearbox 128 (shown in FIG. 2). In this alternative embodiment, lobes 402 are disposed on inner ring 804. Roller bearing cage 802 does not have lobes 402 disposed thereon. Specifically, lobes 402 are disposed on inner-ring shoulders 806 and extend radially outward towards roller bearing cage 802. In this alternative embodiment, inner ring 804 includes three lobes 402 on each inner-ring shoulder 806 of the plurality of inner-ring shoulders 806. Each lobe 402 of the plurality of lobes 402 defines an arc having a radius R1, R2, R3 offset radially from center 702 of bearing assembly 210. Each lobe 402 of the plurality of lobes 402 has a fixed angularity, radially, relative to center 702 of bearing assembly 210. In a manner similar to that described above, in some alternative embodiments, lobes 402 have other geometries including having radii not crossing longitudinal centerline/center 508/702 (shown in FIGS. 8 and 9) of the guided surface. In some alternative embodiments, inner ring 804 includes a fewer or greater number of lobes 402.

Figure 11:
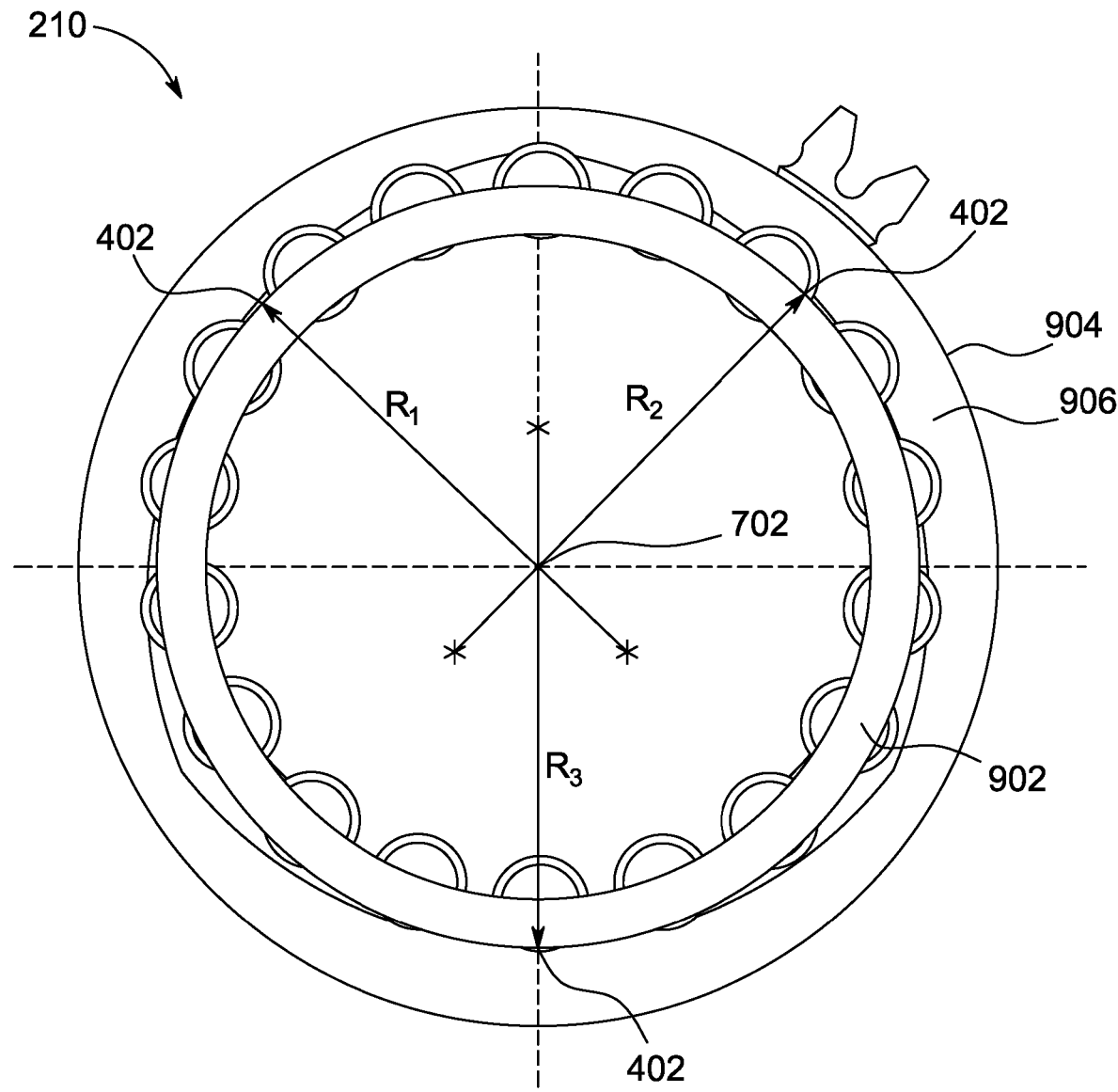
FIG. 11 is a schematic end view of an exemplary alternative roller bearing cage and an outer ring that may be used in the gearbox shown in FIG. 2.

FIG. 11 is a schematic end view of an alternative roller bearing cage 902 and an outer ring 904 that may be used in gearbox 128 (shown in FIG. 2). In this alternative embodiment, lobes 402 are disposed on outer ring 904. Roller bearing cage 902 does not have lobes 402 disposed thereon. Specifically, lobes 402 are disposed on outer-ring shoulders 906 and extend radially inwards towards roller bearing cage 902. In this alternative embodiment, outer ring 904 includes three lobes 402 on each outer-ring shoulder 906 of the plurality of outer-ring shoulders 906. Each lobe 402 of the plurality of lobes 402 defines an arc having a radius R1, R2, R3 offset radially from center 702 of bearing assembly 210. Each lobe 402 of the plurality of lobes 402 has a fixed angularity, radially, relative to center 702 of bearing assembly 210. In a manner similar to that described above, in some alternative embodiments, lobes 402 have other geometries including having radii not crossing longitudinal centerline/center 508/702 (shown in FIGS. 8 and 9) of the guided surface. In some other alternative embodiments, outer ring 904 includes a fewer or greater number of lobes 402.

Embodiments of the bearing assembly, as described above, enable the stable operation of the bearing assembly and compensation for dynamic unbalanced loads and external loads. More specifically, dynamic unbalanced loads can arise in operation due to material and manufacturing inhomogeneities of the cage of the bearing assembly. Dynamic unbalanced loads can also arise in operation when the bearing assembly is included in a planetary gear that orbits a central gear. The orbiting results in an induced centrifugal field that exerts an external load on the cage of the bearing assembly. Another source of external loading to the cage is the interaction between rolling elements and the cage pocket walls. The lobes of the bearing assembly, as described above, compensate for dynamic unbalanced and external loads and facilitate stabilization of the cage by inducing reaction forces between at least one of following; the cage inner surface and the inner-ring outer surface, the cage inner surface and the inner ring shoulder, the cage outer surface and the outer-ring inner surface, and the cage outer surface and the outer-ring shoulder.

Under external or inertia loading the cage may exhibit a tendency to deflect at the pitch diameter of the planet carrier in a planetary gearbox. An alternative embodiment of the present disclosure relates to a bearing assembly having lobes at the inner ring. Lobes at the inner ring facilitate enhanced stable operation and increased life of the bearing by increasing clearance locally at the points where deflection or "pinching" of the cage can occur and reduces rubbing between at least one of following; the cage inner surface and the inner-ring outer surface, the cage inner surface and the inner-ring shoulder, the cage outer surface and the outer-ring inner surface, and the cage outer surface and the outer-ring shoulder.

An exemplary technical effect of the bearing assembly described herein includes at least one of: (a) providing a plurality of reaction forces to dynamic unbalanced loads; (b) centering a roller bearing cage within a bearing assembly; (c) increasing the service life of the bearing assembly; and (d) enabling planetary gears to be operated with greater centrifugal loading.

Exemplary embodiments of bearing assemblies and related components are described above in detail. The system is not limited to the specific embodiments described herein, but rather, components of systems and/or steps of the methods may be utilized independently and separately from other components and/or steps described herein. For example, the configuration of components described herein may also be used in combination with other processes, and is not limited to practice with only turbine assembles and related methods as described herein. Rather, the exemplary embodiment can be implemented and utilized in connection with many applications where increasing the service life of a bearing is desired.

Although specific features of various embodiments of the present disclosure may be shown in some drawings and not in others, this is for convenience only. In accordance with the principles of embodiments of the present disclosure, any feature of a drawing may be referenced and/or claimed in combination with any feature of any other drawing.

This written description uses examples to disclose the embodiments of the present disclosure, including the best mode, and also to enable any person skilled in the art to practice embodiments of the present disclosure, including making and using any devices or systems and performing any incorporated methods. The patentable scope of the embodiments described herein is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A bearing defining a longitudinal centerline extending therethrough, said bearing comprising:
   an inner ring comprising an outer surface;
   a cage comprising an inner surface and an outer surface, said cage inner surface in opposition to said inner ring outer surface;
   an outer ring comprising an inner surface and an outer surface, said outer ring inner surface in opposition to said cage outer surface; and
   a plurality of rollers positioned within said cage to facilitate relative rotation between said outer ring and said inner ring, wherein one of said inner ring, said cage, and said outer ring comprises a plurality of lobes defining a non-circular circumferential profile, said plurality of lobes comprising a first lobe comprising a substantially circular edge and a lobe edge radially spaced from said substantially circular edge, said lobe edge defining an arc having a substantially constant arcual angularity with respect to a longitudinal line extending through said bearing, wherein the longitudinal line is one of substantially parallel to and substantially coincident with the longitudinal centerline.

2. The bearing in accordance with claim 1, wherein:
   said inner ring comprises an inner ring shoulder; and
   said outer ring comprises an outer ring shoulder.

3. The bearing in accordance with claim 2, wherein one of said inner ring outer surface, said inner ring shoulder, said cage inner surface, said cage outer surface, said outer ring inner surface, and said outer ring shoulder comprises said plurality of lobes defining the non-circular circumferential profile.

4. The bearing in accordance with claim 3, wherein a fluid is disposed between each of said inner ring outer surface, said inner ring shoulder, said cage inner surface, said cage outer surface, said outer ring inner surface, and said outer ring shoulder, and wherein the non-circular circumferential profile is configured to facilitate stabilization of said cage by inducing reaction forces between at least one of:
said cage inner surface and said inner ring outer surface;
said cage inner surface and said inner ring shoulder;
said cage outer surface and said outer ring inner surface; and
said cage outer surface and said outer ring shoulder.

5. The bearing in accordance with claim 3, wherein the non-circular circumferential profile is configured to induce reaction forces to increase clearance locally and reduce rubbing between at least one of:
said cage inner surface and said inner ring outer surface;
said cage inner surface and said inner ring shoulder;
said cage outer surface and said outer ring inner surface; and
said cage outer surface and said outer ring shoulder.

6. The bearing in accordance with claim 3, wherein the non-circular circumferential profile and said cage are formed of one or more of a metallic material and a polymer, and wherein the non-circular circumferential profile and said cage are formed by one or more manufacturing technique.

7. A gearbox comprising:
a central gear; and
a plurality of planetary gears positioned circumferentially about said central gear, each planetary gear of said plurality of planetary gears comprising a bearing, a first planetary gear of said plurality of planetary gears comprising a first bearing defining a longitudinal centerline extending therethrough, said first bearing comprising:
an inner ring comprising an outer surface;
a cage comprising an inner surface and an outer surface, said cage inner surface in opposition to said inner ring outer surface;
an outer ring comprising an inner surface and an outer surface, said outer ring inner surface in opposition to said cage outer surface; and
a plurality of rollers positioned within said cage to facilitate relative rotation between said outer ring and said inner ring, wherein one of said inner ring, said cage, and said outer ring comprises a plurality of lobes defining a non-circular circumferential profile, said plurality of lobes comprising a first lobe comprising a substantially circular edge and a lobe edge radially spaced from said substantially circular edge, said lobe edge defining an arc having a substantially constant arcual angularity with respect to a longitudinal line extending through said bearing, wherein the longitudinal line is one of substantially parallel to and substantially coincident with the longitudinal centerline.

8. The gearbox in accordance with claim 7, wherein:
said inner ring comprises an inner ring shoulder; and
said outer ring comprises an outer ring shoulder.

9. The gearbox in accordance with claim 8, wherein one of said inner ring outer surface, said inner ring shoulder, said cage inner surface, said cage outer surface, said outer ring inner surface, and said outer ring shoulder comprises said plurality of lobes defining the non-circular circumferential profile.

10. The gearbox in accordance with claim 9, wherein a fluid is disposed between each of said inner ring outer surface, said inner ring shoulder, said cage inner surface, said cage outer surface, said outer ring inner surface, and said outer ring shoulder, and wherein the non-circular circumferential profile is configured to facilitate stabilization of said cage by inducing reaction forces between at least one of:
said cage inner surface and said inner ring outer surface;
said cage inner surface and said inner ring shoulder;
said cage outer surface and said outer ring inner surface; and
said cage outer surface and said outer ring shoulder.

11. The gearbox in accordance with claim 9, wherein the non-circular circumferential profile is configured to induce reaction forces to increase clearance locally and reduce rubbing between at least one of:
said cage inner surface and said inner ring outer surface;
said cage inner surface and said inner ring shoulder;
said cage outer surface and said outer ring inner surface; and
said cage outer surface and said outer ring shoulder.

12. The gearbox in accordance with claim 9, wherein the non-circular circumferential profile and said cage are formed of one or more of a metallic material and a polymer, and wherein the non-circular circumferential profile and said cage are formed by one or more manufacturing techniques.

13. A rotary machine comprising:
a fan section;
a low-pressure turbine section; and
a gearbox coupled between said fan section and said low-pressure turbine section, said gearbox comprising a plurality of planetary gears positioned circumferentially about a central gear, each planetary gear of said plurality of planetary gears comprising a bearing, a first planetary gear of said plurality of planetary gears comprising a first bearing defining a longitudinal centerline extending therethrough, said first bearing comprising:
an inner ring comprising an outer surface;
a cage comprising an inner surface and an outer surface, said cage inner surface in opposition to said inner ring outer surface;
an outer ring comprising an inner surface and an outer surface, said outer ring inner surface in opposition to said cage outer surface; and
a plurality of rollers positioned within said cage to facilitate relative rotation between said outer ring and said inner ring, wherein one of said inner ring, said cage, and said outer ring comprises a plurality of lobes defining a non-circular circumferential profile, said plurality of lobes comprising a first lobe comprising a substantially circular edge and a lobe edge radially spaced from said substantially circular edge, said lobe edge defining an arc having a substantially constant arcual angularity with respect to a longitudinal line extending through said bearing, wherein the longitudinal line is one of substantially parallel to and substantially coincident with the longitudinal centerline.

14. The rotary machine in accordance with claim 13, wherein:
said inner ring comprises an inner ring shoulder; and
said outer ring comprises an outer ring shoulder.

15. The rotary machine in accordance with claim 14, wherein one of said inner ring outer surface, said inner ring shoulder, said cage inner surface, said cage outer surface, said outer ring inner surface, and said outer ring shoulder comprises said plurality of lobes defining the non-circular circumferential profile.

16. The rotary machine in accordance with claim 15, wherein a fluid is disposed between each of said inner ring outer surface, said inner ring shoulder, said cage inner surface, said cage outer surface, said outer ring inner surface, and said outer ring shoulder, and wherein the non-circular circumferential profile is configured to facilitate stabilization of said cage by inducing reaction forces between at least one of:

said cage inner surface and said inner ring outer surface;
said cage inner surface and said inner ring shoulder;
said cage outer surface and said outer ring inner surface; and
said cage outer surface and said outer ring shoulder.

17. The rotary machine in accordance with claim 15, wherein the non-circular circumferential profile is configured to induce reaction forces to increase clearance locally and reduce rubbing between at least one of:

said cage inner surface and said inner ring outer surface;
said cage inner surface and said inner ring shoulder;
said cage outer surface and said outer ring inner surface; and
said cage outer surface and said outer ring shoulder.

18. The rotary machine in accordance with claim 15, wherein the non-circular circumferential profile and said cage are formed of one or more of a metallic material and a polymer, and wherein the non-circular circumferential profile and said cage are formed by one or more manufacturing techniques.

* * * * *